US009421543B2

(12) United States Patent
Kim et al.

(10) Patent No.: US 9,421,543 B2
(45) Date of Patent: Aug. 23, 2016

(54) HYDRODYNAMIC FILTER UNIT, HYDRODYNAMIC FILTER INCLUDING THE HYDRODYNAMIC FILTER UNIT, AND METHOD OF FILTERING TARGET MATERIAL BY USING THE HYDRODYNAMIC FILTER UNIT AND THE HYDRODYNAMIC FILTER

(75) Inventors: Minseok S. Kim, Yongin-si (KR); Won-ho Lee, Suwon-si (KR); Sun-soo Kim, Suwon-si (KR); Jin-hoon Kim, Suwon-si (KR); Jeong-gun Lee, Seoul (KR); Tae-seok Sim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 933 days.

(21) Appl. No.: 13/434,252

(22) Filed: Mar. 29, 2012

(65) Prior Publication Data

US 2012/0325749 A1 Dec. 27, 2012

(30) Foreign Application Priority Data

Jun. 24, 2011 (KR) ........................ 10-2011-0061799

(51) Int. Cl.

| | |
|---|---|
| ***B01D 33/00*** | (2006.01) |
| ***B01D 15/00*** | (2006.01) |
| ***B01D 33/41*** | (2006.01) |
| ***B01D 37/00*** | (2006.01) |

(Continued)

(52) U.S. Cl.
CPC ..... *B01L 3/502753* (2013.01); *B01L 3/502761* (2013.01); *B01L 2200/0652* (2013.01); *B01L 2300/0816* (2013.01); *B01L 2400/086* (2013.01)

(58) Field of Classification Search
CPC .................... B01L 3/502753; B01L 3/502761; B01L 2200/0652; B01L 2300/0816; B01L 2400/086; Y10T 436/25375; G01N 1/4077; G01N 2001/4088
See application file for complete search history.

(56) References Cited

U.S. PATENT DOCUMENTS

| | | | | |
|---|---|---|---|---|
| 2007/0187250 | A1 | 8/2007 | Huang et al. | |
| 2008/0085551 | A1 | 4/2008 | Kim et al. | |
| 2009/0004730 | A1 * | 1/2009 | Nitta et al. | ................. 435/288.7 |

(Continued)

FOREIGN PATENT DOCUMENTS

| | | | |
|---|---|---|---|
| DE | 19733108 | A1 | 2/1999 |
| EP | 1860179 | A1 | 11/2007 |

(Continued)

OTHER PUBLICATIONS

Chatterjee, Dev K. et al. "Upconversion fluorescence imaging of cells and small animals using lanthanide doped nanocrystals." Biomaterials (2008) 29 937-943.*

(Continued)

*Primary Examiner* — Christopher A Hixson
(74) *Attorney, Agent, or Firm* — Leydig, Voit & Mayer, Ltd.

(57) ABSTRACT

A hydrodynamic filter unit includes an inlet channel connected to a fluid chamber, into which a fluid including a target material is introduced, and a plurality of outlet channels connected to the fluid chamber, through which the fluid is discharged. A filtering method includes introducing a fluid including a target material into the hydrodynamic filter unit through the inlet channel, capturing the target material in the hydrodynamic filter unit, and discharging a remaining part of the fluid outside of the hydrodynamic filter unit through an outlet channel.

19 Claims, 10 Drawing Sheets

(51) Int. Cl.

| | |
|---|---|
| ***B82Y 99/00*** | (2011.01) |
| ***B01L 3/00*** | (2006.01) |

(56) References Cited

U.S. PATENT DOCUMENTS

| | | | | |
|---|---|---|---|---|
| 2009/0283456 | A1 | 11/2009 | Le Vot et al. | |
| 2010/0317093 | A1 | 12/2010 | Turewicz et al. | |
| 2011/0045994 | A1 * | 2/2011 | Voldman et al. | 506/7 |
| 2012/0138540 | A1 | 6/2012 | Kim et al. | |

FOREIGN PATENT DOCUMENTS

| | | | |
|---|---|---|---|
| EP | 2560000 | A2 | 2/2013 |
| JP | 2008-538283 | A | 12/2008 |
| JP | 2009109232 | A | 2/2009 |
| JP | 2009-109232 | A | 5/2009 |
| KR | 10-2005-0096489 | A | 2/1999 |
| KR | 1020110005091 | A | 1/2011 |

OTHER PUBLICATIONS

Nilsson, J. et al. "Review of cell and particle trapping in microfluidic systems." Analytical Chimica Acta (2009) 649 141-157.*

European Patent Office, Extended European Search Report in European Patent Application No. 12165239.0, Feb. 3, 2014, 9 pp.

Crowley et al., "Isolation of plasma from whole blood using planar microfilters for lab-on-a-chip applications", *Lab Chip*, 5: 922-929 (2005).

Sethu et al., "Microfluidic diffusive filter for apheresis (leukapheresis)", Lab Chip, 6: 83-89 (2006).

Vandelinder et al., "Separation of Plasma from Whole Human Blood in a Continuous Cross-Flow in a Molded Microfluidic Device", *Analytical Chemistry*, 78(11); 3765-3771 (2006).

Chinese Patent Office (SIPO), Office Action issued on Apr. 20, 2015 in Chinese Patent Application No. 201210068476X.

* cited by examiner

HYDRODYNAMIC FILTER UNIT, HYDRODYNAMIC FILTER INCLUDING THE HYDRODYNAMIC FILTER UNIT, AND METHOD OF FILTERING TARGET MATERIAL BY USING THE HYDRODYNAMIC FILTER UNIT AND THE HYDRODYNAMIC FILTER

CROSS-REFERENCE TO RELATED APPLICATIONS

This application claims the benefit of Korean Patent Application No. 10-2011-0061799, filed on Jun. 24, 2011, in the Korean Intellectual Property Office, the disclosure of which is incorporated herein in its entirety by reference.

BACKGROUND

Often it is useful to detect target materials on the basis of certain properties of those target materials, for example, size or mass. Target materials can be labelled and then may be detected by using a probe. Alternatively, target materials may be stained and detected based on the properties of the stain. However, when it is desirable to detect target materials on the basis of the size of the target materials, a filter, particularly, a hydrodynamic filter is useful. A hydrodynamic filter is a system for capturing target materials in a fluid by flowing the fluid through the filter. There is a need for hydrodynamic filters and related compositions or methods for effectively detecting target materials.

SUMMARY OF THE INVENTION

A hydrodynamic filter unit is provided herein, which is useful for detecting target materials in a fluid. According to an aspect of the present invention, the hydrodynamic filter unit comprises: a fluid chamber; an inlet channel connected to the fluid chamber into which a fluid comprising a target material is introduced; a plurality of outlet channels connected to the fluid chamber through which the fluid is discharged; and a plurality of capturing portions disposed in connection portions to which the fluid chamber and the plurality of outlet channels are connected.

Each of the plurality of capturing portions may comprise a pair of protrusion portions protruding from the connection portions.

The hydrodynamic filter unit may further comprise an accumulation prevention portion disposed between the plurality of outlet channels, and protruding from an inside surface of the fluid chamber.

The shape of each of the plurality of capturing portions and the accumulation prevention portion may be formed according to the shape of the target material to be detected.

According to one aspect of the invention, the pair of protrusion portions may have a round end portion.

According to another aspect of the present invention, a plurality of hydrodynamic filter units can be arranged in a sequence, thereby providing a hydrodynamic filter sequence.

A hydrodynamic filter also is provided, which comprises a plurality of hydrodynamic filter sequences, each comprising a plurality of hydrodynamic filter units.

The hydrodynamic filter may further include: a body portion comprising the plurality of hydrodynamic filter sequences (e.g., surrounding, encompassing, or otherwise holding or housing the plurality of hydrodynamic filter sequences).

The hydrodynamic filter may further comprise an inlet portion and an outlet portion that are connected to the body portion.

A ratio of a width to a length of the body portion optionally ranges from about 3:1 to about 100:1.

The hydrodynamic filter may further comprise convex portions disposed in a front surface and a rear surface of the plurality of hydrodynamic filter sequences, and protruding from the front surface and the rear surface.

An $n^{th}$ hydrodynamic filter sequence and an $(n+1)^{th}$ hydrodynamic filter sequence among the plurality of hydrodynamic filter sequences may be disposed in a zigzag arrangement (n is a natural number). In other words, in a plurality of hydrodynamic filter sequences arranged parallel to one another, an $n^{th}$ hydrodynamic filter sequence and an $(n+1)^{th}$ hydrodynamic filter sequence can be arranged in an offset manner, such that a filter unit of the nth filter sequence is not directly in-line with a filter unit of the $(n+1)^{th}$ hydrodynamic filter sequence. When arranged in this way, a fluid path through the filter sequences is varied.

A filtering method also is provided, the method comprising introducing a fluid comprising a target material into a hydrodynamic filter unit, as described herein, through the inlet channel; capturing the target material in the hydrodynamic filter unit; and discharging a remaining part of the fluid from the hydrodynamic filter unit (i.e., to the outside of the hydrodynamic filter unit) through the outlet channel.

The filtering method may further comprise attaching any one or more of a bead, hydrogel, nano particle, or aptamer to the target material before the introducing of the fluid into the hydrodynamic filter unit.

Each of the plurality of capturing portions of the hydrodynamic filter unit may include a pair of protrusion portions protruding from the connection portions, and the target material is captured in at least one of the pairs of protrusion portions. The remaining part of the fluid may be discharged through the other pairs of protrusion portions without capturing the target material.

In another aspect, the hydrodynamic filter unit is part of a hydrodynamic filter comprising a plurality of hydrodynamic filter units or a plurality of hydrodynamic filter sequences, the filtering method comprising introducing the fluid comprising the target material into the hydrodynamic filter; capturing the target material in the hydrodynamic filter; and discharging a remaining part of the fluid from the hydrodynamic filter (i.e., to the outside of the hydrodynamic filter).

All other aspects of the filtering method are as described with respect to the hydrodynamic filter unit and hydrodynamic filter.

Additional aspects of the invention will be apparent from the detailed description of the invention and drawings.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
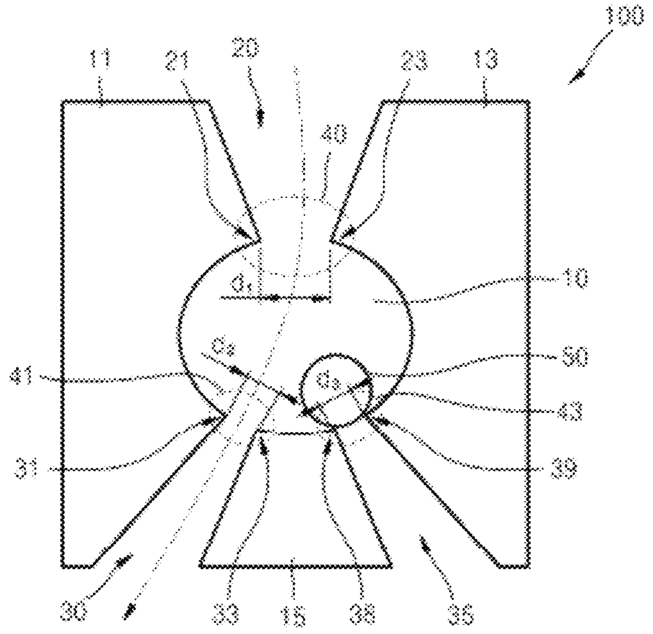
FIGS. 1A and 1B are a plan view and a perspective view of a hydrodynamic filter unit according to an embodiment of the present invention, respectively.

Various example embodiments will now be described more fully with reference to the accompanying drawings in which some example embodiments are shown.

Detailed illustrative example embodiments are disclosed herein. However, specific structural and functional details disclosed herein are merely representative and provided for purposes of describing exemplary embodiments. This invention may, however, be embodied in many alternate forms; the invention should not be construed as limited to the embodiments set forth herein. On the contrary, the invention is considered to cover all modifications, equivalents, and alternatives of the subject matter described herein, including modifications, equivalents, and alternatives of particular embodiments.

It will be understood that, although the terms first, second, etc. may be used herein to describe various elements, these terms are only used to distinguish one element from another and are not intended to otherwise limit the scope of the invention. For example, a first element could be termed a second element, and, similarly, a second element could be termed a first element, without departing from the scope of example embodiments. Furthermore, an embodiment comprising a first and second element might also be configured to comprise additional elements (third, fourth, etc.) even though such additional elements are not shown.

As used herein, the term "and/or," includes any and all combinations of one or more of the associated listed items. Expressions such as "at least one of," when preceding a list of elements, modify the entire list of elements and do not modify the individual elements of the list.

It will be understood that when an element or layer is referred to as being "formed on" or "disposed on" another element or layer, it can be directly or indirectly formed on the other element or layer. That is, for example, intervening elements or layers may be present. In contrast, when an element or layer is referred to as being "directly formed on" or "directly disposed on" another element, there are no intervening elements or layers present. Other words used to describe the relationship between elements or layers should be interpreted in a like fashion (e.g., "between" versus "directly between", "adjacent" versus "directly adjacent", etc.).

As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

The present invention will now be described more fully with reference to the accompanying drawings, in which exemplary embodiments of the invention are shown. In the drawings, the same reference numerals denote the same elements, and sizes of elements may be exaggerated for clarity and convenience.

Figure 1B:
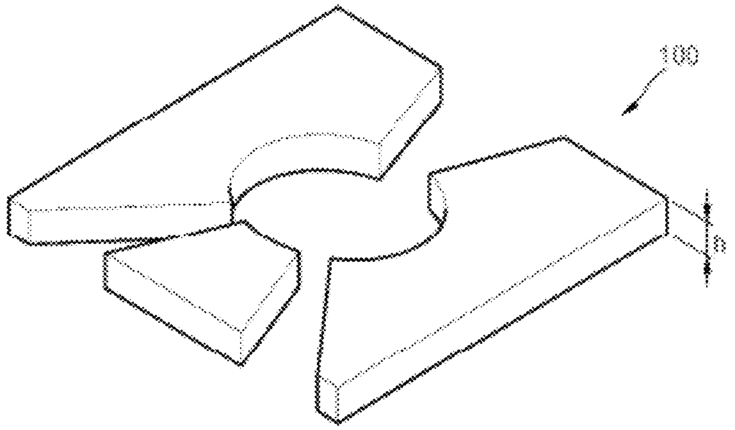

FIGS. 1A and 1B are a plan view and a perspective view of a hydrodynamic filter unit 100 according to an embodiment of the present invention, respectively.

Referring to FIGS. 1A and 1B, the hydrodynamic filter unit 100 may include a fluid chamber 10, an inlet channel 20 that is connected to the fluid chamber 10 and into which a fluid including a target material 50 is introduced, a plurality of outlet channels 30 and 35 that are connected to the fluid chamber 10 and through which the fluid is discharged, and a plurality of capturing portions 41 and 43 that are respectively disposed in connection portions to which the fluid chamber 10 and the outlet channels 30 and 35 are connected and capture the target material 50. The term "connection portion" as used herein refers to the region at which two or more elements are coupled, connected, or otherwise meet. For instance, the inlet channel is connected to the fluid chamber at or by way of a connection portion, and each of the outlet channels is similarly connected to the fluid chamber at or by way of a connection portion. The connection portion can be an element that couples two or more other elements, and can be separate from the two or more other elements or can be an integral part of the two or more other elements.

The hydrodynamic filter unit 100 can have a planar shape that is polygonal such as rectangular. The hydrodynamic filter unit 100 may be formed of a silicon based polymer material or other type of polymer material. The hydrodynamic filter unit 100 may be formed of, for example, acrylate, polymethylacrylate, COO (Cyclic Olefin Copolymer), polymethylmethacrylate (PMMA), polycarbonate, polystyrene, polyimide, epoxy resin, polydimethylsiloxane (PDMS), parylene, etc. In addition, the hydrodynamic filter unit 100 may be formed by etching a silicon wafer, a silicon-on-glass (SOG) wafer, etc.

The fluid chamber 10 may be disposed in one region of the hydrodynamic filter unit 100. For example, when the planar shape of the hydrodynamic filter unit 100 is rectangular, the fluid chamber 10 may be disposed in a center portion of the rectangular shape of the hydrodynamic filter unit 100. The hydrodynamic filter unit 100 may have a circular shape or an oval shape, and additionally have polygonal shapes such as a triangular shape, a rectangular shape, etc. The fluid chamber 10 may be connected to the inlet channel 20 and the outlet channels 30 and 35.

The inlet channel 20 is connected to the fluid chamber 10, and thus the fluid including the target material 50 may be introduced into the fluid chamber 10. The inlet channel 20 may be tapered toward the fluid chamber 10 from the outside of the hydrodynamic filter unit 100. That is, the inlet channel 20 may have a tapered structure in which the inlet channel 20 becomes narrow toward the inside of the hydrodynamic filter unit 100.

A first capturing portion 40 may be disposed in the connection portion where the inlet channel 20 and the fluid chamber 10 are connected to each other and capture the target material 50. That is, the first capturing portion 40 may be disposed in one tapered end portion of the inlet channel 20. The first capturing portion 40 may include a pair of protrusion portions that protrude from the connection portion. The pair of protrusion portions is tapered toward end portions thereof so that the first capturing portion 40 may well capture the target material 50. The ends of the pair of protrusion portions may be sharp or blunt and may be modified in various ways. The size of the first capturing portion 40 is a distance $d_1$ between the pair of protrusion portions, and may be adjusted according to sizes of target materials to be captured. The size $d_1$ of the first capturing portion 40 may be several μm through several hundred μm. For example, the size $d_1$ of the first capturing portion 40 may be about 1 μm through about 500 μm, and more particularly, about 5 μm through about 100 μm.

The plurality of outlet channels 30 and 35 may include, for example, the first and second outlet channels 30 and 35. The first and second outlet channels 30 and 35 are connected to the fluid chamber 10 and may discharge the fluid introduced into the fluid chamber 10 to the outside of the hydrodynamic filter unit 100. The first and second outlet channels 30 and 35 are connected to the fluid chamber 10 in a different direction, for example, in an opposite direction, from the inlet channel 20 and may be spaced apart from each other. The first and second outlet channels 30 and 35 may be tapered toward the fluid chamber 10 from the outside of the hydrodynamic filter unit 100. That is, the first and second outlet channels 30 and 35 may have a tapered structure in which the first and second outlet channels 30 and 35 become narrow toward the inside of the hydrodynamic filter unit 100. The first and second outlet channels 30 and 35 may reduce half a maximum flow speed of the fluid in the fluid chamber 10 compared to one outlet channel.

The plurality of capturing portions 41 and 43 may include, for example, the second and third capturing portions 41 and 43. The second and third capturing portions 41 and 43 are disposed in the connection portions to which the fluid chamber 10 and the outlet channels 30 and 35 are connected and may capture the target material 50. That is, the second and third capturing portions 41 and 43 may be disposed in the tapered end portions of the first and second outlet channels 30 and 35, respectively. Each of the second and third capturing portions 41 and 43 may include a pair of protrusion portions that protrude from the connection portions. The pair of protrusion portions is tapered toward end portions thereof so that the second and third capturing portions 41 and 43 may well capture the target material 50. The ends of the pair of protrusion portions may be sharp or blunt and may be modified in various ways.

The sizes of the second and third capturing portions 41 and 43 are distances $d_2$ and $d_3$ between the pair of protrusion portions, and may be adjusted according to sizes of target materials to be captured. The sizes $d_2$ and $d_3$ of the second and third capturing portions 41 and 43 may be several μm to several hundred μm. For example, the sizes $d_2$ and $d_3$ of the second and third capturing portions 41 and 43 may be about 1 μm to about 500 μm, and more particularly, about 5 μm to about 100 μm. Meanwhile, the sizes $d_2$ and $d_3$ of the second and third capturing portions 41 and 43 may be smaller than the size $d_1$ of the first capturing portion 40. When the size $d_1$ of the first capturing portion 40 is greater than the sizes $d_2$ and $d_3$ of the second and third capturing portions 41 and 43, the target material 50 may be easily introduced into the fluid chamber 10, and may be captured by the second capturing portion 41 or the third capturing portion 43. Further, the size $d_2$ of the second capturing portion 41 may be different from the size $d_3$ of the third capturing portion 43. For example, when the size $d_2$ of the second capturing portion 41 is smaller than the size $d_3$ of the third capturing portion 43, the second capturing portion 41 may capture a target material, i.e., another target material, smaller than the target material 50 captured by the third capturing portion 43.

A height h of the hydrodynamic filter unit 100 may be greater than the size of the target material 50. The greater the height h of the hydrodynamic filter unit 100, the smaller the shear force in the hydrodynamic filter unit 100 and smaller the pressure applied to the target material 50. The height h of the hydrodynamic filter unit 100 may be several μm to several hundred μm. For example, the height h of the hydrodynamic filter unit 100 may be about 10 μm to about 500 μm, and more particularly, about 20 μm to about 200 μm.

The target material 50 to be captured by the hydrodynamic filter unit 100 may, for example, be any of various biological materials. Biological materials may include cells or other biological molecules. Cells may include, for example, cancer cells, red blood cells (RBCs), white blood cells (WBCs), phagocytes, animal cells, and plant cells. Biological molecules may include various biomolecules constituting a living organism, such as proteins, lipids, DNAs, and RNAs, but the present embodiment is not limited thereto. If target material 50 comprises biological molecules, since sizes of the biological molecules range from several nanometers (nm) to several hundred nanometers (nm), a size of the hydrodynamic filter unit 100, i.e. a size of a capturing portion, may range from several nanometer (nm) to several hundred nanometers (nm). In this regard, the target material 50 may include, for example, cells such as circulating tumor cells (CTCs) included in blood. The number of CTCs may be so small that only one CTC is detected from among about $10^9$ cells. For example, in the case of breast cancer, about 5 CTCs or less may be detected in about 7.5 ml of blood, and in the case of colon cancer, 3 CTCs or less may be detected in about 7.5 ml of blood. Accordingly, it is very important to capture such a small number of CTCs without loss. Also, since CTCs are easily destroyed, external environmental factors that may destroy CTCs should be minimized.

Since the hydrodynamic filter unit 100 may capture the target material 50 in any of the first through third capturing portions 40, 41, and 43, target material 50 is more likely to be captured. Since cells (e.g., CTCs) are surrounded by flexible cell membranes, some of the cells (e.g., CTCs) may be deformed to some extent, for instance, by the hydrostatic pressure of fluid flow through the hydrodynamic filter unit. In this instance, and in other circumstances, the target material can comprise elements that have different shapes or sizes. The portion of the target material 50 having one shape or size, for instance, undeformed CTCs, may be captured by the first capturing portion 40, and the target material 50 having a different shape or size, for instance, deformed CTCs, may be captured by the second capturing portion 41 or the third capturing portion 43, thereby reducing the amount of target material (e.g., number of CTCs) that are not filtered and, thus, are lost. Since the hydrodynamic filter unit 100 may filter only desired target material, a time taken to analyze target material may be reduced. Also, since there is often no need to separate the desired target molecules from other materials, efficiency and convenience may be improved.

Meanwhile, if the hydrodynamic filter unit 100 includes one outlet channel, if a capturing portion captures a target material, the outlet channel is blocked. Then, since a fluid is continuously introduced into a fluid chamber through an inlet channel, a pressure of the fluid chamber rises, and high pressure may be applied to the target material. The target material may be discharged to the inlet channel or the outlet channel and lost. However, when, for example, the third capturing portion 43 captures the target material 50, although the target material 50 blocks the second outlet channel 35, the fluid may be discharged to the first outlet channel 30 including the second capturing portion 41 that does not capture the target material 50. Further, molecules, other than the target material 50, along with the fluid may be discharged to the first outlet channel 30. Thus, the pressure of the fluid chamber 10 drops, thereby preventing high pressure from being applied to the target material 50 and the target material 50 from being lost.

Referring to FIG. 1A, to further describe the hydrodynamic filter unit 100, the hydrodynamic filter unit 100 may include a first portion 11, a second portion 13 spaced apart from the first portion 11 and facing the first portion 11, and a third portion 15 disposed between the first and second portions 11 and 13. An inlet channel 20 may be disposed between front end portions of the first and second portions 11 and 13. The third portion 15 may be disposed between rear end portions of the first and second portions 11 and 13, the rear end portion being that end portion or region of the first and second portions furthest from the inlet chamber. A first outlet channel 30 may be formed between the first and third portions 11 and 15. A second outlet channel 35 may be formed between the second and third portions 13 and 15. Meanwhile, the hydrodynamic filter unit 100 may include more portions (e.g., a fourth portion, fifth portion, sixth portion, etc.) arranged relative to the first, second, and third portions so as to provide more outlet channels (e.g., a third outlet channel, fourth outlet channel, fifth outlet channel, etc.).

The first portion 11 may include first and second protrusions 21 and 31 that are formed in a first side direction that may face the second portion 13. The second portion 13 may include third and fourth protrusions 23 and 39 formed toward the first portion 11. The third portion 15 may include a fifth protrusion 33 formed toward the first portion 11 and a sixth protrusion 38 formed toward the second portion 13.

The portions can be arranged such that the protrusions of the portions define a fluid chamber and capturing portions. The first protrusion 21 may correspond to the third protrusion 23. The first capturing portion 40 may be formed by the first and third protrusions 21 and 23. The second protrusion 31 may correspond to the fifth protrusion 33. The second capturing portion 41 may be formed by the second and fifth protrusions 31 and 33. The fourth protrusion 39 may correspond to the sixth protrusion 38. The third capturing portion 43 may be formed by the fourth and sixth protrusion 39 and 38.

Figure 2:
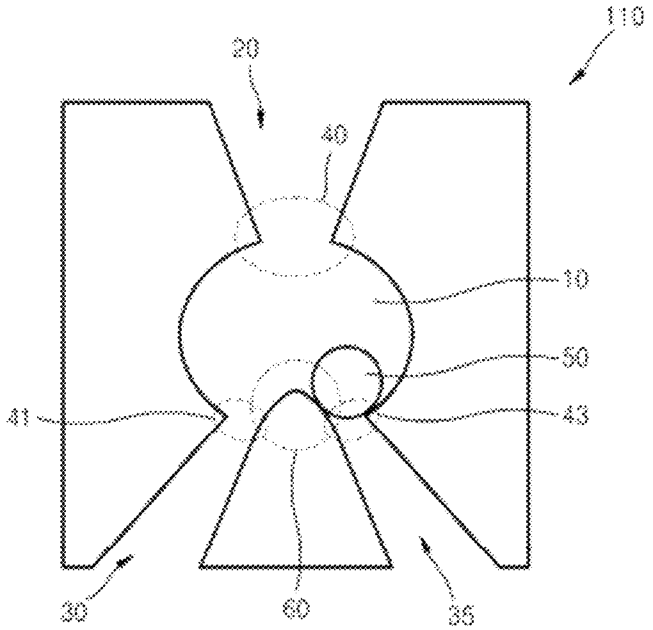
FIG. 2 is a plan view of a hydrodynamic filter unit according to another embodiment of the present invention.

FIG. 2 is a plan view of a hydrodynamic filter unit 110 according to another embodiment of the present invention. The differences between the hydrodynamic filter unit 100 described with reference to FIGS. 1A and 1B and the hydrodynamic filter unit 110 will now be described in detail.

Referring to FIG. 2, the hydrodynamic filter unit 110 may include the fluid chamber 10, the inlet channel 20 that is connected to the fluid chamber 10 and into which a fluid including the target material 50 is introduced, the outlet channels 30 and 35 that are connected to the fluid chamber 10 and through which the fluid is discharged, and the capturing portions 41 and 43 that are respectively disposed in connection portions to which the fluid chamber 10 and the outlet channels 30 and 35 are connected and capture the target material 50.

The hydrodynamic filter unit 110 may further include an accumulation prevention unit 60 disposed between the capturing portions 41 and 43. The accumulation prevention unit 60 may be disposed between the outlet channels 30 and 35, i.e., between the capturing portions 41 and 43. The accumulation prevention unit 60 may be a region protruding from an inside surface of the fluid chamber 10. Thus, the accumulation prevention unit 60 may prevent molecules other than the target material 50 from being accumulated between the capturing portions 41 and 43. For example, when CTCs are captured by the third capturing portion 43, the accumulation prevention unit 60 may prevent RBCs or WBCs other than CTCs from being accumulated between the capturing portions 41 and 43. Thus, the hydrodynamic filter unit 110 prevents molecules other than the target material 50 to be captured from being accumulated in the fluid chamber 10 and captures the target material 50, thereby increasing purity of the target material 50 to be filtered.

Figure 3:
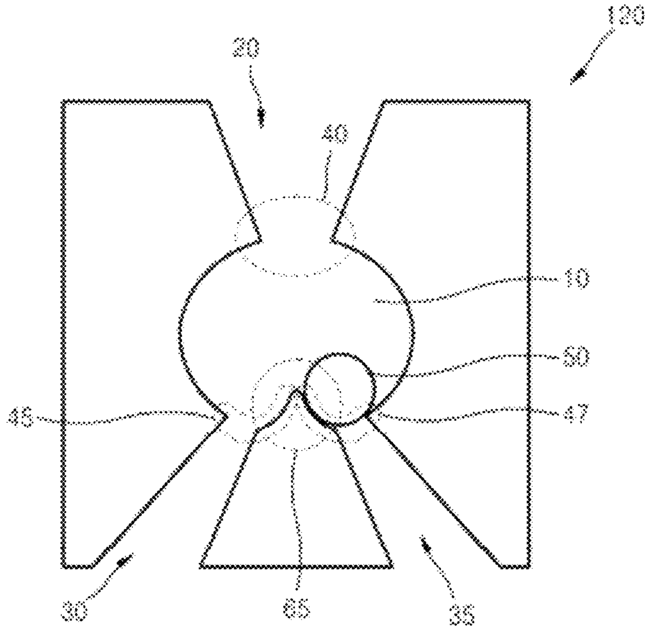
FIG. 3 is a plan view of a hydrodynamic filter unit according to another embodiment of the present invention.

FIG. 3 is a plan view of a hydrodynamic filter unit 120 according to another embodiment of the present invention. The differences between the hydrodynamic filter units 100 and 110 described with reference to FIGS. 1A, 1B, and 2, and the hydrodynamic filter unit 120 will now be described in detail.

Referring to FIG. 3, the hydrodynamic filter unit 120 may include the fluid chamber 10, the inlet channel 20 that is connected to the fluid chamber 10 and into which a fluid including the target material 50 is introduced, the outlet channels 30 and 35 that are connected to the fluid chamber 10 and through which the fluid is discharged, and capturing portions 45 and 47 that are respectively disposed in connection portions to which the fluid chamber 10 and the outlet channels 30 and 35 are connected and capture the target material 50. The hydrodynamic filter unit 120 may further include an accumulation prevention unit 65 disposed between the capturing portions 45 and 47.

Shapes of the second and third capturing portions 45 and 47 and the accumulation prevention unit 65 may be formed according to the shape of the target material 50 to be captured. That is, the shapes of the second and third capturing portions 45 and 47 and the accumulation prevention unit 65 may be formed in such a way that a contact area of the target material 50 and the second and third capturing portions 45 and 47 and the accumulation prevention unit 65 may be maximized. For example, when the target material 50 is spherical, the shapes of the second and third capturing portions 45 and 47 and the accumulation prevention unit 65 may be half-spherical. Thus, an external force applied to the captured target material 50 is distributed to the contact area of the target material 50 and the second and third capturing portions 45 and 47 and the accumulation prevention unit 65, and thus the hydrodynamic filter unit 120 may more stably capture the target material 50 and reduce stress applied to the target material 50.

Figure 4:
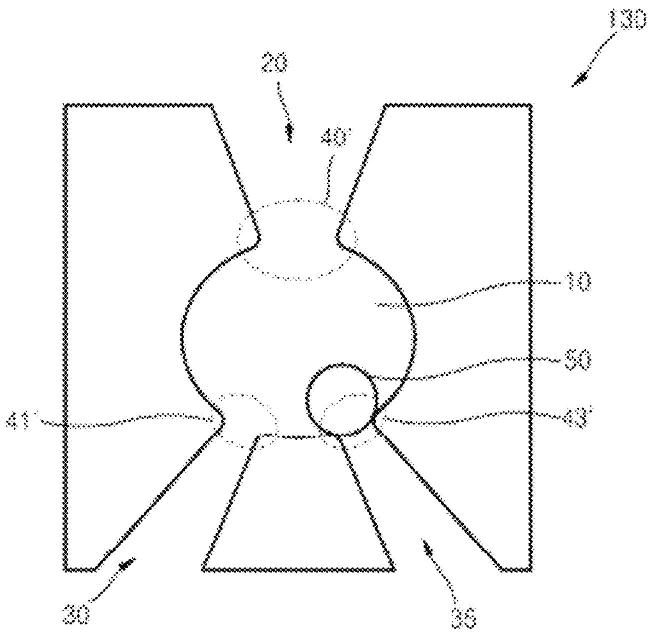
FIG. 4 is a plan view of a hydrodynamic filter unit according to another embodiment of the present invention.

FIG. 4 is a plan view of a hydrodynamic filter unit 130 according to another embodiment of the present invention. The differences between the hydrodynamic filter units 100, 110, and 120 described with reference to FIGS. 1A, 1B, 2, and 3, and the hydrodynamic filter unit 130 will now be described in detail.

Referring to FIG. 4, the hydrodynamic filter unit 130 may include the fluid chamber 10, the inlet channel 20 that is connected to the fluid chamber 10 and into which a fluid including the target material 50 is introduced, the outlet channels 30 and 35 that are connected to the fluid chamber 10 and through which the fluid is discharged, and a plurality of capturing portions 41' and 43' that are respectively disposed in connection portions to which the fluid chamber 10 and the outlet channels 30 and 35 are connected and capture the target material 50.

A first capturing portion 40' may be disposed in a connection portion to which the inlet channel 20 and the fluid chamber 10 are connected and capture the target material 50.

That is, the first capturing portion 40' may be disposed in one tapered end portion of the inlet channel 20. The first capturing portion 40' may include a pair of protrusion portions that protrude from the connection portion. The pair of protrusion portions may have round end portions. If the protrusion portions are round, the target material 50 may be prevented from being damaged due to the protrusion portions.

The capturing portions 41' and 43' may include second and third capturing portions 41' and 43'. The second and third capturing portions 41' and 43' may be disposed in the connection portions to which the fluid chamber 10 and the outlet channels 30 and 35 are connected and capture the target material 50. That is, the second and third capturing portions 41' and 43' may be disposed in the tapered end portions of the first and second outlet channels 30 and 35, respectively. Each of the second and third capturing portions 41' and 43' may include a pair of protrusion portions that protrude from the connection portion. The pair of protrusion portions may have round end portions. If the protrusion portions are round, the target material 50 may be prevented from being damaged due to the protrusion portions. Thus, hydrodynamic filter unit 130 may prevent the target material 50 from being damaged due to the protrusion portions of the first through third capturing portions 40', 41', and 43'.

Figure 5:
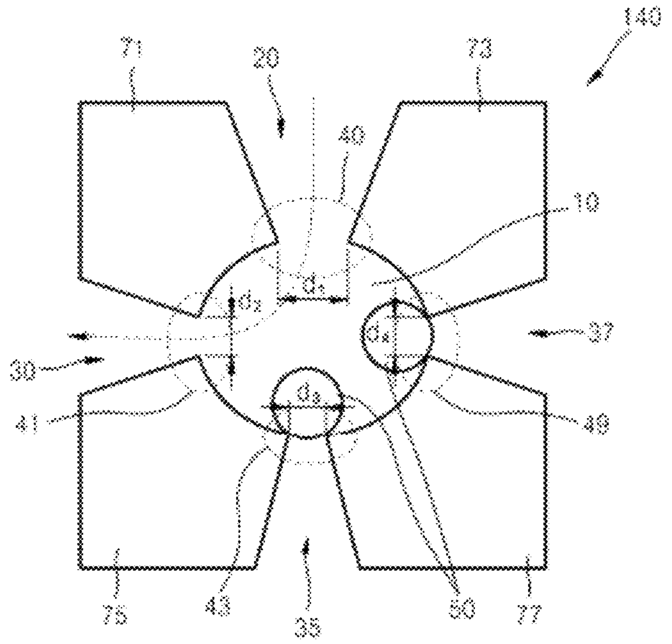
FIG. 5 is a plan view of a hydrodynamic filter unit according to another embodiment of the present invention.

FIG. 5 is a plan view of a hydrodynamic filter unit 140 according to another embodiment of the present invention. The differences between the hydrodynamic filter units 100, 110, 120, and 130 described with reference to FIGS. 1A, 1B, 2, 3, and 4, and the hydrodynamic filter unit 140 will now be described in detail.

Referring to FIG. 5, the hydrodynamic filter unit 140 may include the fluid chamber 10, the inlet channel 20 that is connected to the fluid chamber 10 and into which a fluid including the target material 50 is introduced, the outlet channels 30, 35, and 37 that are connected to the fluid chamber 10 and through which the fluid is discharged, and the capturing portions 41, 43, and 49 that are respectively disposed in connection portions to which the fluid chamber 10 and the outlet channels 30, 35, and 37 are connected and capture the target material 50.

The fluid chamber 10 may be connected to the inlet channel 20 and the first through third outlet channels 30, 35, and 37. If the hydrodynamic filter unit 140 is, for example, rectangular, the inlet channel 20 and the first through third outlet channels 30, 35, and 37 may be disposed in four side surfaces of the hydrodynamic filter unit 140, respectively. As described above, the first capturing portion 40 may be disposed in the connection portion to which the inlet channel 20 and the fluid chamber 10 are connected and capture the target material 50. The second through fourth capturing portions 41, 43, and 49 may be disposed in the connection portions to which the fluid chamber 10 and the outlet channels 30, 35, and 37 are connected and capture the target material 50. That is, the second through fourth capturing portions 41, 43, and 49 may be respectively disposed in the tapered end portions of the outlet channels 30, 35, and 37, respectively. Each of the second through fourth capturing portions 41, 43, and 49 may include a pair of protrusion portions that protrude from the connection portions. The pair of protrusion portions becomes narrow toward end portions thereof so that the second through fourth capturing portions 41, 43, and 49 may well capture the target material 50. The ends of the pair of protrusion portions may be sharp or round and may be modified in various ways.

Although a plurality of the target materials 50 are captured, the hydrodynamic filter unit 140 including the outlet channels 30, 35, and 37 and the capturing portions 41, 43, and 49 may discharge the fluid and molecules other than the target materials 50 through a capturing portion that fails to capture the target material 50 and an outlet channel. Thus, the fluid chamber 10 maintains low pressure, thereby preventing high pressure from being applied to the target material 50 and preventing the target material 50 from being lost.

Referring to FIG. 5, to further describe the hydrodynamic filter unit 140, the hydrodynamic filter unit 140 may include first through fourth portions 71, 73, 75, and 77. The first through fourth portions 71, 73, 75, and 77 may be spaced apart from each other with respect to the fluid chamber 10. The inlet channel 20 may be disposed between the first and second portions 71 and 73. The first through third outlet channels 30, 35, and 37 may be disposed between the first and third portions 71 and 75, between the third and fourth portions 75 and 77, and between the second and fourth portions 73 and 77, respectively.

Figure 6:
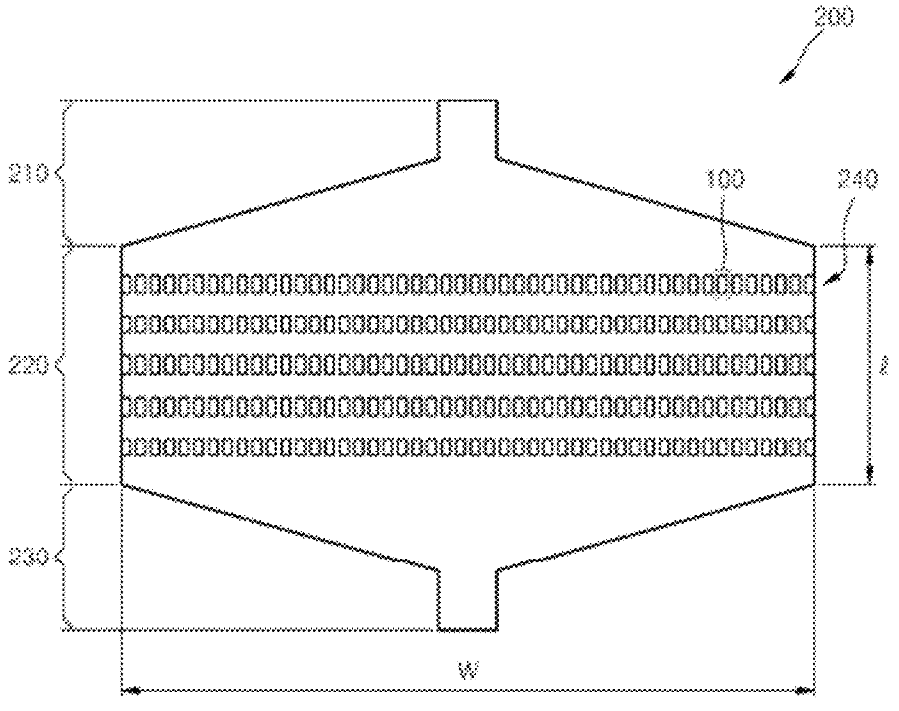
FIG. 6 is a plan view of a hydrodynamic filter according to an embodiment of the present invention.

FIG. 6 is a plan view of a hydrodynamic filter 200 according to an embodiment of the present invention.

Referring to FIG. 6, the hydrodynamic filter 200 may include an inlet portion 210, a body portion 220, and an outlet portion 230. The hydrodynamic filter 200 may include a plurality of the hydrodynamic filter units 100 described above. The hydrodynamic filter 200 may include a plurality of hydrodynamic filter sequences 240 including the plurality of hydrodynamic filter units 100. Meanwhile, the hydrodynamic filter 200 may include the hydrodynamic filter units 110, 120, 130, and 140.

The inlet portion 210 and the outlet portion 230 may be disposed to face each other with the body portion 220 therebetween. The inlet portion 210 may be connected to the body portion 220 so that a fluid including target materials may be introduced into the body portion 220 from the outside. When a predetermined pressure is applied through the inlet portion 210, the fluid may flow through the body portion 220. A connection portion to which the inlet portion 210 and the body portion 220 are connected may be widened toward the body portion 220. Also, the other connection portion to which the outlet portion 230 and the body portion 220 are connected may be widened toward the body portion 220. Meanwhile, the outlet portion 230 may discharge a fluid filtered by the hydrodynamic filter 200 to the outside, and the filtered fluid may again be introduced into the inlet portion 210 and may again be filtered by the hydrodynamic filter 200.

The body portion 220 may include the hydrodynamic filter units 100 and the hydrodynamic filter sequences 240 including the hydrodynamic filter units 100. A width w of the body portion 220 may be greater than the length l thereof. For example, a ratio of the width w and the length l of the body portion 220 may be more than 3:1. Further, the ratio of the width w and the length l of the body portion 220 may range from about 3:1 to about 100:1. More particularly, the ratio of the width w and the length l of the body portion 220 may range from about 3:1 to about 50:1 and from about 3:1 to about 30:1. If the width w of the body portion 220 is greater than the length l thereof, a maximum speed of a flow rate and a maximum pressure applied to target materials may be reduced.

The hydrodynamic filter sequences 240 may include the hydrodynamic filter units 100 that are spaced apart from each other or are adjoined with each other. The hydrodynamic filter sequences 240 may be spaced apart from each other and arranged in parallel to each other in a direction of the length l of the body portion 220. Meanwhile, the hydrodynamic filter sequences 240 may include the hydrodynamic filter units 110, 120, 130, and 140.

Figure 7:
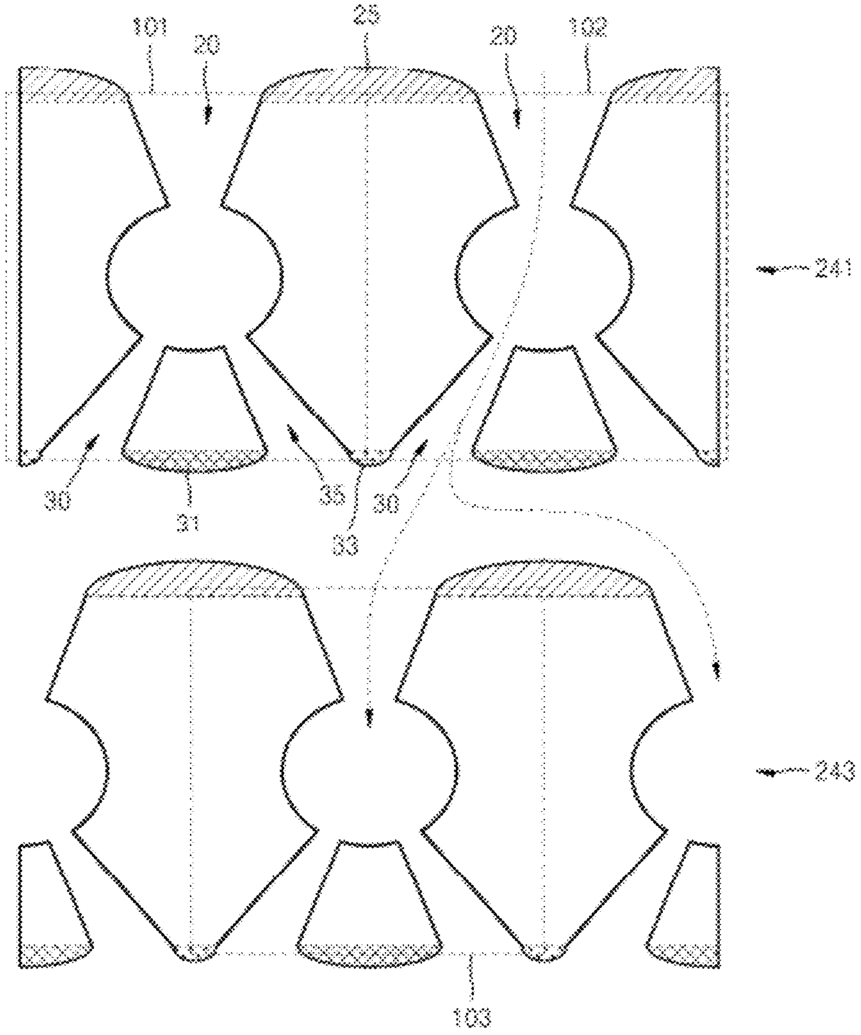
FIG. 7 is a plan view of hydrodynamic filter sequences included in the hydrodynamic filter of FIG. 6.

FIG. 7 is a plan view of hydrodynamic filter sequences 241 and 243 included in the hydrodynamic filter 200 of FIG. 6.

Referring to FIG. 7, the $n^{th}$ (n is a natural number) and $(n+1)^{th}$ hydrodynamic filter sequences 241 and 243 may be arranged in parallel to each other in a direction of the length l of the body portion 220. A hydrodynamic filter unit 101 or 102 included in the $n^{th}$ hydrodynamic filter sequence 241 and a hydrodynamic filter unit 103 included in the $(n+1)^{th}$ hydrodynamic filter sequence 243 may not be disposed in a line (i.e., may be disposed in an offset manner). That is, hydrodynamic filter units included in the $n^{th}$ hydrodynamic filter sequence 241 and hydrodynamic filter units included in the $(n+1)^{th}$ hydrodynamic filter sequence 243 may be disposed in a zigzag manner. Thus, if the $n^{th}$ hydrodynamic filter sequence 241 and the $(n+1)^{th}$ hydrodynamic filter sequence 243 are disposed in zigzags, a fluid, target molecules, and other molecules may have various movement paths. Meanwhile, the hydrodynamic filter units included in the $n^{th}$ hydrodynamic filter sequence 241 and the hydrodynamic filter units included in the $(n+1)^{th}$ hydrodynamic filter sequence 243 may not be disposed in zigzags and may be disposed in parallel (in alignment) to each other.

Convex portions 25, 31, and 33 may be disposed in front surfaces of the $n^{th}$ hydrodynamic filter sequence 241 and the $(n+1)^{th}$ hydrodynamic filter sequence 243 into which the fluid is injected and rear surfaces through which the fluid is discharged. The convex portions 25, 31, and 33 may protrude from the front surfaces and the rear surfaces and be referred to as stagnation prevention portions that prevent a stagnation of the fluid. The first convex portion 25 may be disposed between the inlet channels 20 of adjacent hydrodynamic filter units 101 and 102. The second convex portion 31 may be disposed between the first and second outlet channels 30 and 35. The third convex portion 33 may be disposed between the second outlet channels 35 of the hydrodynamic filter unit 101 and the first outlet channels 30 of the adjacent hydrodynamic filter unit 102. The first through third convex portions 25, 31, and 33 may prevent target materials or other molecules from being accumulated due to the stagnant fluid around the $n^{th}$ hydrodynamic filter sequence 241 and the $(n+1)^{th}$ hydrodynamic filter sequence 243.

A method of filtering target materials by using a hydrodynamic filter unit or a hydrodynamic filter including the hydrodynamic filter unit will now be described below.

Referring to FIG. 1A, the method may include introducing a fluid including the target material 50 into the hydrodynamic filter unit 100 described above through the inlet channel 20, capturing the target material 50 in the hydrodynamic filter unit 100, and discharging a remaining part of the fluid to the outside of the hydrodynamic filter unit 100 through the outlet channel 30 without the captured target material 50. Meanwhile, the method may include introducing the fluid including the target material 50 into the hydrodynamic filter units 110, 120, 130, and 140 described above.

The method may further include, before the introducing of the fluid into the hydrodynamic filter unit 100, attaching at least one binder to the target material 50. The binder may include bead, hydro gel, nano particles, or aptamer. The aptamer may include DNA, RNA, or peptide. The binder may be selectively or specifically attached to only the target material 50. Sizes of the target material 50 to which the binder is attached may be increased to make it more likely that the target material 50 is captured by the first through third capturing portions 40, 41, and 43. For example, if the target material 50 is CTCs, a plurality of beads may be attached onto the CTCs. It may be difficult to elastically deform cell membranes of the CTCs due to the beads attached onto the CTCs. Thus, the captured CTCs to which the beads are attached may be more easily captured by the second capturing portion 41 or the third capturing portion 43 and rarely leak out of the fluid chamber 10.

Referring to FIG. 6, another method may include introducing a fluid including target material 50 into the hydrodynamic filter 200 described above, capturing the target material 50 in the hydrodynamic filter 200, and discharging a remaining part of the fluid to the outside of the hydrodynamic filter 200. The method may further include, before the introducing of the fluid into the hydrodynamic filter 200, attaching at least one binder to the target material 50. The binder may include bead, hydro gel, nano particles, or aptamer. The aptamer may include DNA, RNA, or peptide. The binder may be selectively or specifically attached to only the target material 50.

FIGS. 8A through 8D are plan views of a hydrodynamic filter unit for explaining a sequential filtering process. Sizes of first through third capturing portions of the hydrodynamic filter unit may be about 8 μm. A speed of a fluid flowing through the hydrodynamic filter unit may be about 100 μl/min. The target material 50 is a breast cancer cell (MCF-7) 50. A binder 55 uses a polystyrene or melamine bead. A size of the polystyrene or melamine bead is about 3 μm.

Figure 8A:
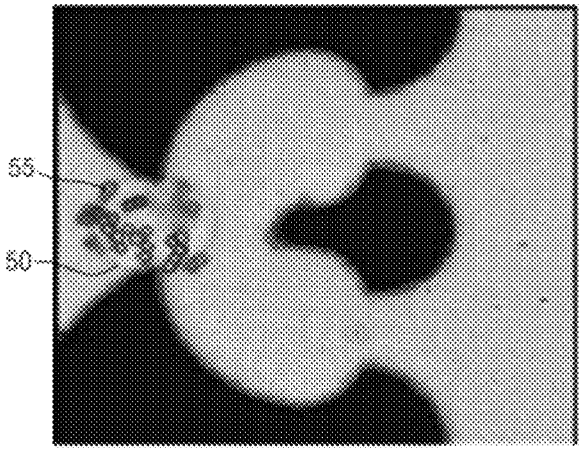
FIGS. 8A through 8D are plan views of a hydrodynamic filter unit for explaining a sequential filtering process.

Referring to FIG. 8A, the breast cancer cell 50 to which the bead 55 is attached passes through a first capturing portion. A size of the breast cancer cell 50 to which the bead 55 is attached may be increased to make it more likely that the breast cancer cell 50 is captured by the first through third capturing portions. It may be difficult to elastically deform cell membranes of the breast cancer cell 50. Thus, the breast cancer cell 50 may rarely leak out of the fluid chamber.

Figure 8B:
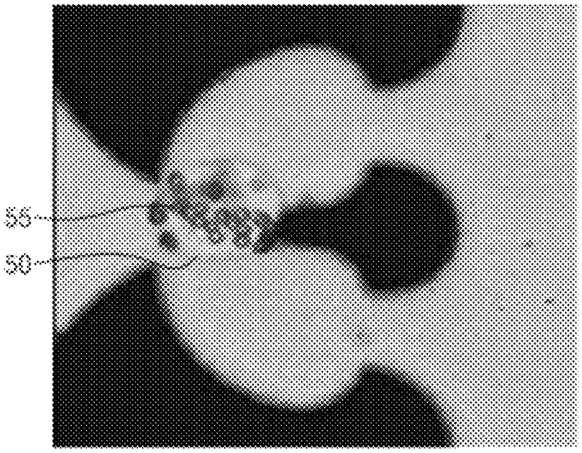

Referring to FIG. 8B, the breast cancer cell 50 that passed the first capturing portion moves to a third capturing portion by using an accumulation prevention portion that protrudes. The accumulation prevention portion may prevent molecules other than the breast cancer cell 50 from being accumulated between a plurality of capturing portions. The accumulation prevention portion may induce the breast cancer cell 50 to move to a second capturing portion or the third capturing portion.

Figure 8C:
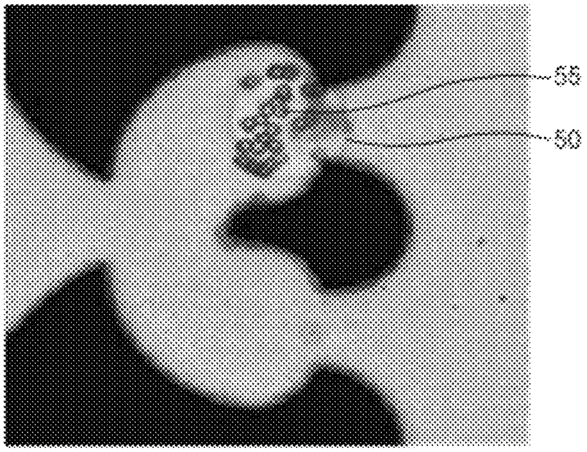

Referring to FIG. 8C, the breast cancer cell 50 was captured in the third capturing portion. The breast cancer cell 50 captured in the third capturing portion blocks a second outlet channel. Nevertheless, a fluid may be discharged to a first outlet channel including the second capturing portion that does not capture the breast cancer cell 50. Molecules other than the breast cancer cell 50 and the fluid may be discharged to the first outlet channel. Thus, a fluid chamber maintains low pressure, thereby preventing high pressure from being applied to the breast cancer cell 50 and accordingly preventing the breast cancer cell 50 from being lost from the fluid chamber.

Figure 8D:
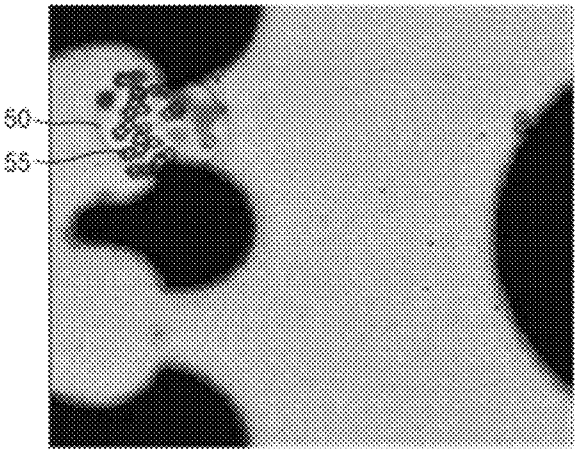

Referring to FIG. 8D, although the fluid is continuously introduced into the fluid chamber, the breast cancer cell 50 is being still captured in the third capturing portion. Thus, high pressure is not applied to the breast cancer cell 50 and the breast cancer cell 50 is not lost from the fluid chamber, thereby enhancing a recovery of target molecules.

Figure 9:
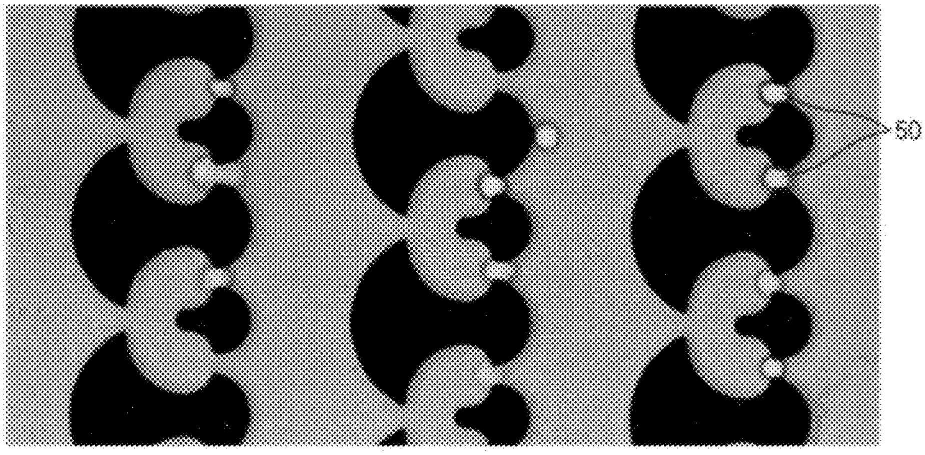
FIG. 9 is a plan view of a hydrodynamic filter for explaining a filtering process.

FIG. 9 is a plan view of the hydrodynamic filter for explaining a filtering process. The target material 50 is a breast cancer cell (MCF-7) 50. Sizes of first through third capturing portions of the hydrodynamic filter unit may be about 8 μm. A speed of a fluid flowing through the hydrodynamic filter unit may be about 100 μl/min.

Referring to FIG. 9, the hydrodynamic filter includes a plurality of hydrodynamic filter units. The hydrodynamic filter units may form a plurality of hydrodynamic filter sequences arranged in a line. The hydrodynamic filter sequences may be disposed in parallel to each other and disposed in zigzags to each other. That is, hydrodynamic filter units included in an $n^{th}$ hydrodynamic filter sequence and hydrodynamic filter units included in a $(n+1)^{th}$ hydrodynamic filter sequence may not be disposed in a line. Thus, if the $n^{th}$ hydrodynamic filter sequence and the $(n+1)^{th}$ hydrodynamic filter sequence are disposed in zigzags, a fluid, target molecules, and other molecules may have various movement paths. Convex portions may be disposed in front surfaces of the $n^{th}$ hydrodynamic filter sequence and the $(n+1)^{th}$ hydrodynamic filter sequence into which a fluid is injected and rear surfaces through which the fluid is discharged. The convex portions may protrude from the front surfaces and the rear surfaces and be referred to as stagnation prevention portions that prevent a stagnation of the fluid.

Each hydrodynamic filter unit may capture one target material 50. That is, the hydrodynamic filter units may capture a plurality of target materials 50. If a capturing portion of a hydrodynamic filter unit captures one target material 50, a newly introduced target material 50 may bypass a different outlet channel. The newly introduced target material 50 may be captured in another capturing portion. Thus, the hydrodynamic filter units may increase capture efficiency of target materials and prevent the target materials 50 from being accumulated in one capturing portion. A flow of a fluid introduced into the hydrodynamic filter units may be prevented from being interfered with due to the accumulated target material 50 or other materials, and fluid stress applied to the target material 50 may be reduced.

While the present invention has been particularly shown and described with reference to exemplary embodiments thereof using specific terms, the embodiments and terms have been used to explain the present invention and should not be construed as limiting the scope of the present invention formed by the claims. The preferred embodiments should be considered in a descriptive sense only and not for purposes of limitation. Therefore, the scope of the invention is formed not by the detailed description of the invention but by the appended claims, and all differences within the scope will be construed as being included in the present invention.

What is claimed is:

1. A hydrodynamic filter unit comprising:

at least first, second, and third structural portions defining, in part, a fluid chamber;

an inlet channel connected to the fluid chamber and tapered toward the fluid chamber by which a fluid can be introduced into the fluid chamber;

a plurality of outlet channels connected to the fluid chamber through which fluid from the fluid chamber can be discharged, wherein the plurality of outlet channels are tapered toward the fluid chamber; a first capturing portion comprising a pair of protrusions spaced apart by a distance $d_1$ disposed between the inlet channel and the fluid chamber; and a plurality of second capturing portions each comprising a pair of protrusions spaced apart by a distance less than $d_1$ disposed between the fluid chamber and each of the plurality of outlet channels;

wherein the first structural portion comprises first and second protrusions from a side of the first structural portion facing the second structural portion and the second structural portion comprises third and fourth protrusions from a side of the second structural portion facing the first structural portion, wherein the first and third protrusions provide the first capturing portion of the hydrodynamic filter and the second and fourth protrusions are each part of one of the plurality of second capturing portions.

2. The hydrodynamic filter unit of claim 1, further comprising:

an accumulation prevention portion comprising a region protruding from an inside surface of the fluid chamber, which is disposed between the plurality of outlet channels.

3. The hydrodynamic filter unit of claim 2, wherein shapes of the plurality of capturing portions and the accumulation prevention portion are formed according to a shape of the target material.

4. The hydrodynamic filter unit of claim 1, wherein the protrusions have a round end portion.

5. A hydrodynamic filter comprising a plurality of hydrodynamic filter sequences, wherein each hydrodynamic filter sequence comprises a plurality of hydrodynamic filter units of claim 1.

6. The hydrodynamic filter of claim 5, further comprising:

a body portion.

7. The hydrodynamic filter of claim 6, further comprising:

an inlet portion; and an outlet portion, wherein the inlet portion and the outlet portion are connected to the body portion.

8. The hydrodynamic filter of claim 6, wherein a ratio of width to length of the body portion ranges from about 3:1 to about 100:1.

9. The hydrodynamic filter of claim 5, further comprising:

convex portions disposed in a front surface and a rear surface of each of the plurality of hydrodynamic filter sequences, the convex portions protruding from the front surface and the rear surface.

10. The hydrodynamic filter of claim 5, wherein an $n^{th}$ hydrodynamic filter sequence and an $(n+1)^{th}$ hydrodynamic filter sequence, among the plurality of hydrodynamic filter sequences, are disposed in a zigzag arrangement, wherein n is a natural number.

11. A filtering method comprising:

introducing a fluid including a target material into the inlet channel of a hydrodynamic filter unit of claim 1;

capturing the target material in the hydrodynamic filter unit; and discharging a part of the fluid from the hydrodynamic filter unit through an outlet channel.

12. The filtering method of claim 11, further comprising attaching one or more of a bead, hydro gel, nanoparticle, or aptamer to the target material before introducing the fluid comprising the target material into the hydrodynamic filter unit.

13. The filtering method of claim 11, wherein the target material is captured in at least one of the pairs of protrusions of a capturing portion.

14. The filtering method of claim 13, wherein the fluid is discharged through a pair of protrusions that is different from the protrusions in which the target material is captured.

15. A hydrodynamic filter unit comprising:

a fluid chamber;

an inlet channel connected to the fluid chamber and tapered toward the fluid chamber by which a fluid can be introduced into the fluid chamber;

a first capturing portion comprising a pair of protrusions configured to capture a first target material in the fluid, the first capturing portion being disposed between the inlet channel and the fluid chamber;

a plurality of outlet channels connected to the fluid chamber through which fluid from the fluid chamber can be discharged, wherein the plurality of outlet channels are tapered toward the fluid chamber;

a plurality of second capturing portions each comprising a pair of protrusions configured to capture a second target material in the fluid, each of the plurality of second capturing portions being disposed between the fluid chamber and each of the plurality of outlet channels; and first, second, and third planar-shaped portions of a polymer or silicon material defining the fluid chamber, inlet channel, and plurality of outlet channels, wherein the inlet channel is disposed between the first and second planar-shaped portions, a first outlet channel is disposed between the first and third planar-shaped portions, and a second outlet channel is disposed between the second and third planar-shaped portions.

16. The hydrodynamic filter unit of claim 1, wherein a first outlet channel of the plurality of outlet channels is disposed between the first and third structural portions and a second outlet channel of the plurality of outlet channels is disposed between the second and third structural portions.

17. The hydrodynamic filter unit of claim 1 further comprising a fourth structural portion, wherein a first outlet channel of the plurality of outlet channels is disposed between the first and third structural portions, a second outlet channel of the plurality of outlet channels is disposed between the third and fourth structural portions, and a third outlet channel is disposed between the second and fourth structural portions.

18. The method of claim 11, wherein a first outlet channel of the plurality of outlet channels is disposed between the first and third structural portions and a second outlet channel of the plurality of outlet channels is disposed between the second and third structural portions.

19. A filtering method comprising:

introducing a fluid including a target material into the inlet channel of a hydrodynamic filter unit of claim 15;

capturing the target material in the hydrodynamic filter unit; and discharging a part of the fluid from the hydrodynamic filter unit through an outlet channel.

* * * * *